United States Patent [19]
Penrod

[11] Patent Number: 5,733,141
[45] Date of Patent: Mar. 31, 1998

[54] TRAVEL HOME CABLE TELEVISION ANTENNA CONNECTOR ASSEMBLY

[76] Inventor: Gary D. Penrod, 6430 Greeley Hill Rd., Greeley Hill, Calif. 95311

[21] Appl. No.: 506,550

[22] Filed: Jul. 25, 1995

[51] Int. Cl.⁶ .................................................. H02G 11/00
[52] U.S. Cl. ........................ 439/501; 439/4; 191/12.2 R
[58] Field of Search ................. 439/501, 4; 191/12.2 R, 191/12.4

[56] References Cited

U.S. PATENT DOCUMENTS

| | | | |
|---|---|---|---|
| 2,013,733 | 9/1935 | Murphy | 191/12.4 |
| 3,715,526 | 2/1973 | Blanch et al. | 191/12.2 R |
| 4,138,177 | 2/1979 | Van Valer | 191/12.4 |
| 4,284,180 | 8/1981 | Masters | 439/4 |
| 4,713,497 | 12/1987 | Smith | 439/164 |
| 5,101,082 | 3/1992 | Simmons et al. | 191/12.2 R |

Primary Examiner—Gary F. Paumen

[57] ABSTRACT

A travel home cable television antenna connector assembly having a take-up reel that is activated to spring bias a first length of coaxial cable to be coiled within a housing of the take-up reel and that allows the first length of cable to be pulled from the housing and out of the travel home for connection to a cable television antenna fixed source, and a second length of coaxial cable having one end connected to a television set within the travel home and another end electrically connected to said first length of coaxial cable within the housing.

2 Claims, 1 Drawing Sheet

1

TRAVEL HOME CABLE TELEVISION ANTENNA CONNECTOR ASSEMBLY

BRIEF DESCRIPTION OF THE INVENTION

1. Field of the Invention

This invention relates to cable television antennas and particularly to connector systems providing for coupling television sets in travel homes such as motor homes, campers, trailers, vans and the like, to fixed cable television antenna sources.

2. Prior Art

It has now become common for user's of travel homes such as motor homes, campers, travel trailers, vans and the like, to carry a coil of coaxial cable having male and female couplings on opposite ends thereof, in their vehicles. The coil of cable is used by connecting one end to a television set or to a splitter connected to multiple television sets and the cable then passed through window or door openings such that the the other end is connected to a fixed television antenna source.

It has become common for the operator's of recreational parks, campgrounds and such, established for use by users of motor homes, campers, trailers, and the like to provide fixed television antenna sources at designated vehicle sites. When a travel vehicle is moved into a designated site the connection between fixed antenna source and television set or sets within the travel vehicle is established using the coil of coaxial cable carried for the purpose.

OBJECTS OF THE INVENTION

It is a principal object of the present invention to provide a travel home cable television antenna connector assembly that will allow for quick and easy connection of a coaxial cable between a fixed antenna source and the television set or sets within the travel home.

Another object is to provide a travel home cable television antenna connector assembly that will automatically take up and store the coaxial cable within a travel home when the cable is disconnected from a fixed antenna source.

Still another object is to provide a travel home cable television antenna connector assembly with a coiled coaxial cable readily pulled from a travel vehicle to be connected to a fixed antenna source.

FEATURES OF THE INVENTION

Principal features of the invention include a spring loaded take-up reel mounted within a travel vehicle inside a cabinet or at another out-of-the-way location and such that one end of a first coaxial cable length, the other end of which is electrically connected to the reel will be passed through a wall of the travel vehicle to be held firmly against the wall of the vehicle until pulled therefrom by the user, as necessary to be coupled to a fixed antenna source. Another coaxial cable length has one end electrically connected to the take-up reel and to the first coaxial cable and another end connected to a television set or television sets within the travel home.

Additional objects and features of the invention will become apparent from the following detailed description and drawing, disclosing what is presently contemplated as being the best mode of the invention.

THE DRAWINGS

In the drawings:

FIG. 1 is a cut-away section through a travel home and showing a take-up reel suspended inside a cabinet of the travel home;

FIG. 2, an enlarged fragmentary view, taken within the line 2—2 of FIG. 1;

FIG. 3, a front elevation view of the section shown in FIG. 2; and

FIG. 4, a view taken on the line 4—4 of FIG. 1.

DETAILED DESCRIPTION OF THE INVENTION

Figure 1:
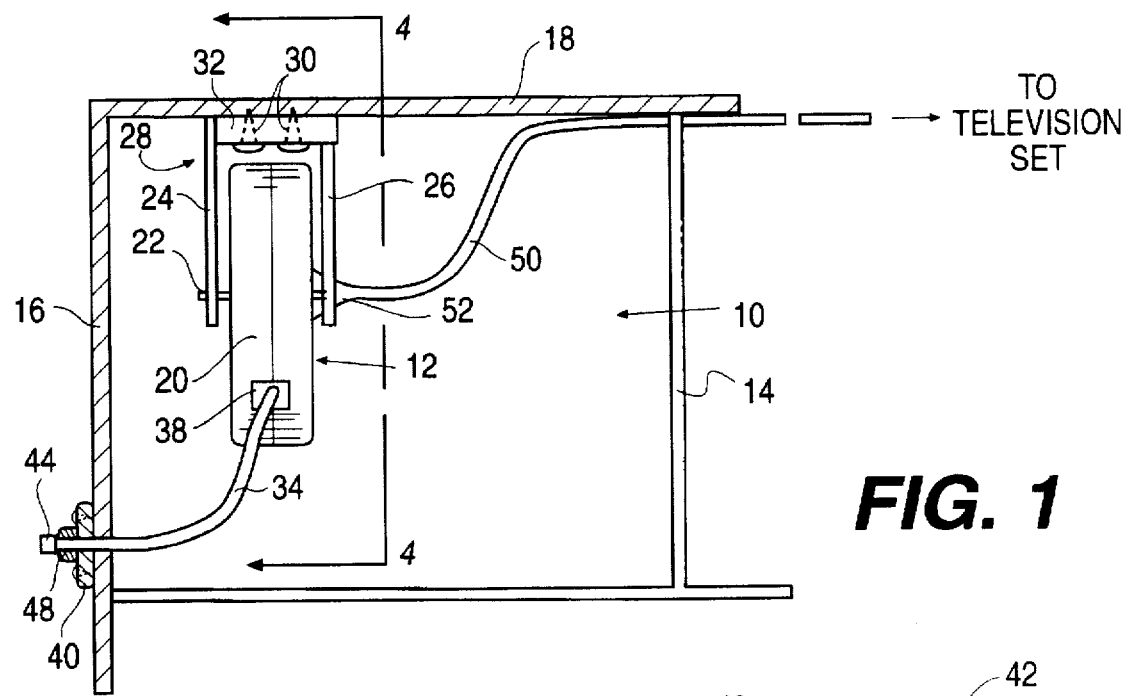
Figure 2:
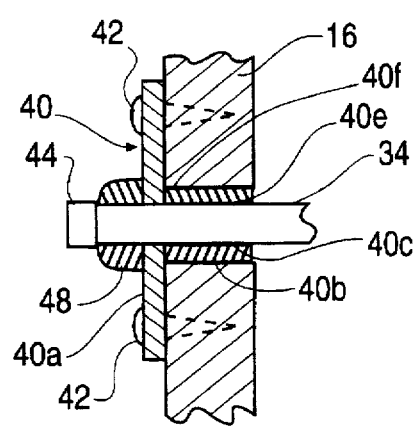
Figure 3:
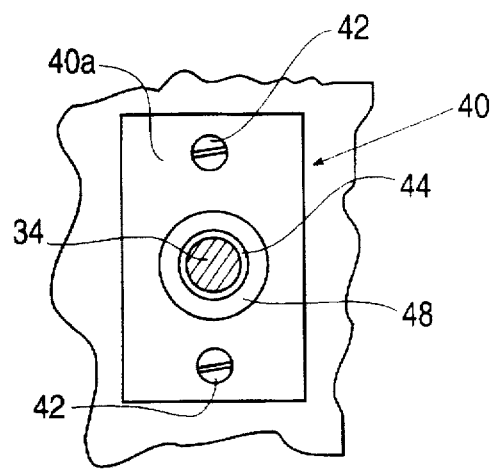
Figure 4:
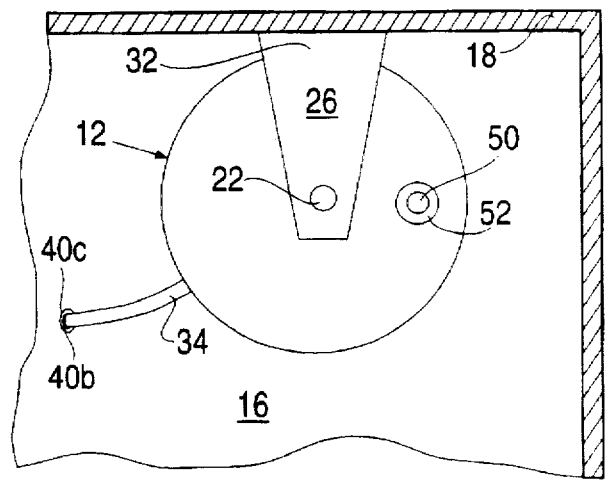

Referring now to the drawings:

In the illustrated preferred embodiment the travel home cable television antenna connector assembly is shown generally at 10.

Connector assembly 10 includes a spring loaded take-up reel 12 shown mounted inside a cabinet 14 of a travel home having an exterior wall 16 and ceiling 18, shown fragmentarily in FIG. 1.

Take-up reel 12 is generally of conventional construction and includes a housing 20, with a take-up drum inside the housing. The housing 20 and the take-up drum, not shown, inside the housing, are both mounted to rotate on an axis shaft 22. Axis shaft 22 is connected between spaced apart legs 24 and 26 of a U-shaped bracket 28. Screws 30, passed through a web 32 of the bracket 28 and screwed into ceiling 16 hold the take-up reel 12 in place within the cabinet 14.

A first length of coaxial cable 34 enters housing 20 through an opening 38 in the periphery of the housing to be coiled around the take-up drum in the housing. The end of the first length of coaxial cable inside housing 20 is then electrically connected to a contact ring on the take-up drum and maintains such electrical contact during rotation of the take-up drum.

Coaxial cable 34 also passes through a sleeve plate 40, secured by screws 42 to the exterior of wall 16 of the travel home and has a female coaxial cable connector 44 secured to the end 46 of the cable. A rubber or plastic coated grommet 48 is crimped or otherwise secured around the end of the coaxial cable 34 adjacent to the female coaxial cable connector 44.

Sleeve plate 40 has a face plate 40a that fits flat against the exterior of wall 16 of the travel vehicle and through which upper and lower screws 42 are passed. The sleeve plate also has a projecting sleeve 40b that extends into a hole 40c through the wall 16 and through which the cable 34 is passed. The ends 40e and 40f of the sleeve 40b are rounded to prevent scraping of the cable 34 as the cable is pulled out through and retracted back through the sleeve 40b.

When the cable 34 is fully retracted the grommet 48 engages the sleeve plate 40 and serves to seal the sleeve 40b around the cable.

Another length of coaxial cable 50 enters housing 20 through a fitting 52, eccentrically mounted with respect to the axis shaft 22 and is electrically connected to a contact ring on the take-up drum and through the drum to the first length of coaxial coil.

Coaxial cable 50 also connects to a television set (not shown) or through a conventional splitter to more than one television set within the travel vehicle.

The construction of the take-up drum, including spring re-wind, locking mechanism and contact rings is well known, and is not therefore, described in detail herein. The take-up reel, including housing, bracket and take-up drum is a commercially available component of the present travel home cable connector assembly. The take-up reel may be of the type manufactured and marketed by Alert Stamping & Mfg Co., Inc., and shown in U.S. Pat. No. 3,715,526 or may be of the type shown in U.S. Pat. No. 4,713,497.

In use, once the length of coaxial cable 50 is coupled to a television set the connection remains in place, even during travel of the travel vehicle.

During travel of the travel vehicle from site to site the length of coaxial cable 34 is spring biased around the take-up drum. When it desired to couple the cable 34 to a fixed cable antenna source the grommet 48 is grasped and the cable 34 is pulled from the housing 20. The pull of the cable 34 partially rotates housing 20 with respect to the take-up drum and releases the cable from the drum, which rotates inside the housing as the cable 34 is pulled therefrom. Coaxial cable connector 44 can then be attached to a cooperating fitting at a fixed cable television antenna connector source, not shown. Upon disconnection of the coaxial cable 34 from the fixed antenna source, a pull on the cable 34 will activate the spring retraction assembly (not shown) within the housing 20 to rewind cable 34 on the cable take-up drum.

Although a preferred form of my invention has been herein disclosed it is to be understood that the present disclosure is by way of example and that variations are possible without departing from the subject matter coming within the scope of the following claims, which subject matter I regard as my invention.

I claim:

1. A travel home cable television antenna connector assembly comprising
   a coaxial cable take-up reel having a housing, a spring biased take-up drum within the housing and having a pair of electrically interconnected contact rings on said take-up drum;
   a bracket connected to said housing to allow rotation of said housing and said take-up drum on a common axis;
   means to secure said bracket to the interior of a travel home;
   a first length of coaxial cable passed through the housing of the take-up reel and around the take-up drum and having one end inside said housing and electrically connected to one of said contact rings and a connector fitting on the other end thereof for connection to a fixed cable antenna source outside the travel home; and
   a second length of coaxial cable extending into the housing and with the end of the second length of coaxial cable within the housing electrically connected to the other of said contact rings and the other end of said length of coaxial cable having television set connecting means thereon.

2. A travel home cable television antenna connector assembly as in claim 1, further including
   a grommet fixed to and surrounding the end of the first length of coaxial cable having the connector fitting thereon;
   a sleeve plate having a sleeve through which the first length of coaxial cable is passed and a flat plate surrounding one end of said sleeve; and
   means for securing said flat plate to an exterior of the travel home with the sleeve extending through a hole in the wall of the travel home.

* * * * *